June 2, 1925.
W. A. EARHART
ADJUSTABLE HARROW AND DRAG
Original Filed April 3, 1922
1,540,549
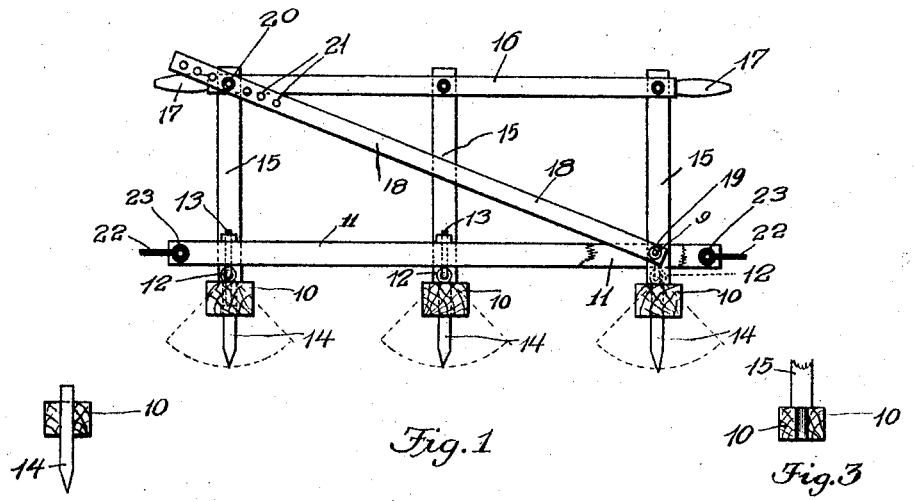
Fig. 1
Fig. 3
Fig. 2
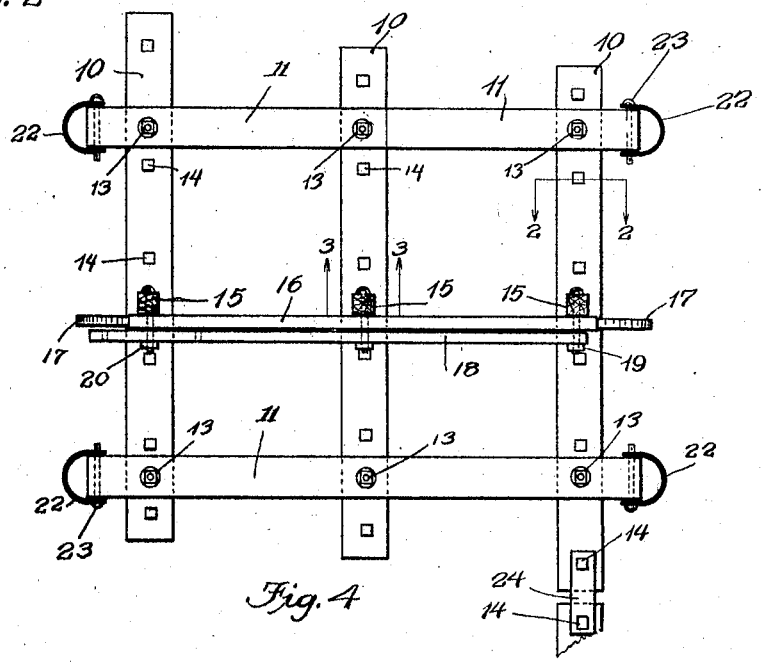
Fig. 4
Inventor
William A. Earhart,
By Mawhinney & Mawhinney
Attorney Patented June 2, 1925.

1,540,549

UNITED STATES PATENT OFFICE.

WILLIAM A. EARHART, OF EAST RADFORD, VIRGINIA.

ADJUSTABLE HARROW AND DRAG.

Application filed April 3, 1922, Serial No. 549,038. Renewed March 3, 1925.

*To all whom it may concern:*

Be it known that I, WILLIAM A. EARHART, a citizen of the United States, residing at East Radford, in the county of Montgomery and State of Virginia, have invented certain new and useful Improvements in Adjustable Harrows and Drags, of which the following is a specification.

The present invention relates to farming implements, and more particularly to that class known as harrows and drags.

An object of the present invention is to provide a harrow which may be adjusted so as to dispose its teeth at the desired angle and which may also be adjusted transversely for off-setting the teeth longitudinally from one another.

Another object of the invention is to provide a harrow which may be adjusted for operation in either direction so that the implement may be operated by draft from either end.

A further object of the invention is to provide a harrow with teeth which are adjustable in such wise as to permit of the sharpening of the teeth by dragging the harrow over the ground, and which permits of the simultaneous and equal adjustment of all of the teeth of the harrow to preserve uniformity in the angular adjustment thereof.

A still further feature of this invention is the provision of a combined harrow and drag which may be made of stock material; which requires no peculiarly constructed parts and which may be assembled or built up from beams, bolts and the like with but slight and inconsequential changes.

The invention also embodies the detachable mounting of the harrow teeth or cross members and in the adjustment of the cross members for tilting the same about their longitudinal axes to dispose their lower ground contacting faces at various inclinations according to the character of work to be done by the implement when used as a drag.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a side elevation of a combined harrow and drag constructed according to the present invention;

Fig. 2 is a detail sectional view taken on the line 2—2 of Fig. 4, showing the manner of holding the teeth in one of the cross members;

Fig. 3 is a similar view taken on the line 3—3 of Fig. 4, showing the mounting of one of the operating arms on an adjacent cross member; and, Fig. 4 is a top plan of the device, illustrating the transverse adjustment of the cross members.

Referring to the drawing, 10 designates a plurality of cross bars or members which are held in longitudinal spaced apart relation by a pair of side bars 11. The side bars 11 may be in any desired number according to the size of the implement and the cross members 10 may also be in any desired number to meet conditions required in the size of the device.

For securing the cross members 10 to the side bars 11, the cross members 10 are provided with eye-bolts 12 which have their heads projecting from the upper sides of the cross members and which are secured by nuts or the like counter-sunk in the lower sides of the cross members to provide smooth and uninterrupted lower faces thereof. The eye-bolts 12 are hingedly connected to heads of eye-bolts 13 which are secured in inverted position in the side bars 11 to provide hinged connections between the side bars and cross members and upon which the cross members may swing as is indicated by dotted lines in Fig. 1. Removably fitted at suitably spaced intervals throughout the lengths of the cross members 10 are teeth 14 of suitable configuration for use on a harrow and which project downwardly from the cross members for engagement in the surface of the ground.

As shown in Fig. 4, the cross members 10 may be secured in transversely spaced relation to the side bars 11, or may be given any other suitable adjustment depending upon the position of the eye-bolts 12 in the cross members.

Each cross member 10 is provided at an intermediate point with an upstanding rocker or tilting member 15, the same being preferably reduced and fitted downwardly into the adjacent cross member as shown in Fig. 3 and the arms 15 of the various cross members being arranged preferably in longitudinal alinement and being connected together, pivotally, by a tie bar 16 at their upper ends. The tie bar 16 may be provided with handles 17 on opposite ends by means of which the tie bar may be shifted lengthwise from either end of the harrow to swing the arms 15 to the desired angle.

For the purpose of holding the arms 15 in adjusted position, a diagonal locking bar 18 is used. One end of the bar 18 is pivoted by a bolt 19, to an end rocking arm 15 near the lower end thereof. The bar 18 extends upwardly toward the other end of the harrow and is detachably secured thereto by a bolt 20 which is carried on the opposite end arm 15 near the top thereof and which is adjustably engaged in a selected one of a row of openings 21 formed in the upper end of the locking bar 18.

The side bars 11 are provided on opposite ends with connecting straps 22 or the like which are pivotally connected by bolts 23 to the ends of the side bars so that draft animals or a draft device may be coupled to either end of the harrow for dragging the same in either direction: thus sharpening the teeth.

As shown at the bottom of Fig. 4, a connecting bar or plate 24 may be used for coupling together a number of the harrows thus constructed, the bar 24 having openings in opposite ends to receive the upper ends of the harrow teeth 14 therethrough, the adjacent end teeth 14 of adjacent harrows being used for coupling purposes.

It is thought the use of the device is apparent for when the harrow is drawn in one direction, the tilting arms 15 may be adjusted to swing the teeth 14 of the harrow to the desired angle in either a forward direction for cutting into the surface of the earth or may be swung backwardly for sharpening the teeth for other purposes as may be found desirable during the use of the device. It is also apparent that when it is desired to draw the device in an opposite direction the arms 15 may be quickly adjusted into a reverse position for accomplishing the same purpose while the device is being drawn in the opposite direction.

When the implement is to be used as a drag, the teeth 14 are removed and the cross members 10 may thus be adjusted to present their lower flat faces at the desired inclination to the surface of the ground as is found expedient during use.

The entire device is composed of a compact assemblage and relation of stock pieces of eye-bolts, and beams and thus affords a very economical and practical device for all uses to which a harrow or draw may be put.

It is obvious that various changes and modifications may be made in the details of construction and design of the above specifically described embodiment of this invention without departing from the spirit thereof, such changes and modifications being restricted only by the scope of the following claims:

What is claimed is:

1. A combined harrow and drag comprising side members, cross members hinged to the side members, arms projecting upwardly from the cross members, a bar pivotally connecting the upper ends of said arms, and a diagonal brace member adjustably connected to vertical spaced apart portions of remote arms for rigidly holding the same in adjusted position.

2. A combined harrow and drag comprising a pair of side members, cross members arranged beneath the side members, interfitting eye-bolts carried respectively upon the side and cross members for hingedly connecting the latter to the side members, an arm upstanding from each cross member, a tie bar pivotally connected across the upper ends of said arms, a locking bar pivoted at one end to the lower end of one arm and having a row of openings in its opposite end, and a bolt carried by another arm and selectively engaged in one of said openings for holding said arms in various positions of adjustment.

In testimony whereof I, affix my signature.

WILLIAM A. EARHART.